UNITED STATES PATENT OFFICE.

FRIEDRICH LEHNER, OF ZURICH, SWITZERLAND.

PROCESS FOR PREPARING ARTIFICIAL THREADS OR FILMS, AS ALSO ARTIFICIAL HORSEHAIR.

986,017. Specification of Letters Patent. Patented Mar. 7, 1911.

No Drawing. Application filed April 26, 1910. Serial No. 557,830.

*To all whom it may concern:*

Be it known that I, FRIEDRICH LEHNER, citizen of Germany, residing at Zurich, Switzerland, have invented certain new and useful Improvements in Processes for Preparing Artificial Threads or Films, as also Artificial Horsehair; and I do hereby declare the following to be a full, clear, and exact description of the invention, such as will enable others skilled in the art to which it appertains to make and use the same.

It is well known that solutions of copper-oxid-ammonia-cellulose easily decompose at ordinary temperature in consequence of oxidation of the dissolved cellulose, so that after a short time they can no longer be spun. Such solutions must therefore be prepared and stored at relatively low temperatures of about 0° to 5° C. On the other hand it has been found that ammoniacal solutions of cuprous chlorid are well adapted for the preparation of permanent and concentrated spinning solutions. It was already known that cellulose is soluble in cuprous chlorid ammonia, but hitherto this knowledge has not been made use of in the manufacture of artificial threads or filaments. In consequence of the reducing action of the cuprous chlorid, the cellulose, when dissolved in cuprous chlorid ammonia, is guarded against oxidation, this being the case even with concentrated solutions prepared and stored at ordinary temperatures, without cooling. But cuprous chlorid may also be used for improving and making permanent solutions of cupric-oxid-ammonia-cellulose. If at ordinary temperature, cellulose is added to a solution of cupric oxid ammonia until no more is dissolved and then cuprous chlorid added, it will be possible to dissolve further amounts of cellulose, thus greatly enriching the solution and at the same time rendering it permanent.

By intimately mixing dry cellulose with dry cuprous chlorid a powder is obtained, which if kept from contact with the air, is practically imperishable and from which a good spinning solution can at any time be prepared with the help of a concentrated aqueous solution of ammonia. A part of the cuprous chlorid may be replaced by copper hydroxid. It is also possible to attain this end by impregnating cellulose with cupric chlorid and then precipitating cuprous chlorid by the addition of sulfurous acid. After washing with water and drying, this product will also be easily soluble in ammonia solution. Finally, the cellulose may first be impregnated with ammonia solution and then cuprous chlorid added, and the mass then caused to dissolve by kneading.

In place of cellulose, materials containing cellulose may also be used, for instance, cellulose hydrate or hydro-cellulose. Addition of silk-fibroin, casein and the like are not excluded, but are however, not advantageous.

Example I: 50 grams of finely divided cellulose, for instance, well bleached cotton, are added at ordinary temperature to 900 grams of an aqueous solution of ammonia of 0.900 sp. g., in which latter 100 grams of cuprous chlorid have been dissolved. By stirring, a clear, homogeneous solution of blue color will be quickly obtained, in which, even with the microscope, no undissolved threads appear. This solution is then filtered through a fabric of wool or a fine hair sieve and pressed through a capillary or slit-like aperture into a precipitating liquid to coagulate. A warm solution of caustic potash or soda is very well suited for a precipitating liquid. The product is washed with acids and water in order to remove all copper salts and finally dried under tension. Acids or solutions of salts may also be used as a precipitating liquid; but in this case the formation of the threads or filaments will not take place so quickly. Also, the products thus obtained are not so strong and firm.

Example II: Cellulose is added to a cupric oxid ammonia solution containing from 2 to 3% copper until no more is dissolved. The degree of solubility depends on the quality of the cellulose and also on the concentration of the liquid ammonia. When the cellulose is no longer dissolved, but only swells, cuprous chlorid in powder form is added, which will then be dissolved together with the swollen cellulose. By alternately adding small quantities of cellulose and cuprous chlorid, it is possible to increase the concentration of the solution to double the initial value without changing the amount of ammonia; at the same time the solution will become more and more viscid. Finally the solution is filtered and further treated as already explained under Example I.

Example III: 100 parts by weight of dried bleached cotton are well wetted in a mixing vessel with 1250 parts by weight of watery ammonia solution of 0.900 sp. g., to which 150 parts by weight of cuprous chlorid are then added, and then stirred to cause solution. A part of the cuprous chlorid may be replaced by an equivalent amount of cupric hydroxid or carbonic cupric oxid.

What I claim as my invention and desire to secure by Letters Patent, is:

1. The process of preparing concentrated cellulose solutions adapted for spinning and the like, which consists in making an ammoniacal solution of cellulose and cuprous chlorid.

2. The process of preparing concentrated cellulose solutions adapted for spinning and the like, which consists in making an ammoniacal solution of cellulose, cuprous chlorid, and cupric oxid.

3. The process of preparing concentrated cellulose solutions adapted for spinning and the like, which consists in making an ammoniacal solution of cellulose and copper salts including cuprous chlorid.

4. The process of preparing concentrated cellulose solutions adapted for spinning and the like, which consists in mixing cellulose, cuprous chlorid and aqueous ammonia.

5. The process of preparing concentrated cellulose solutions adapted for spinning and the like, which consists in making an ammoniacal solution of cellulose and cupric oxid, and adding thereto cuprous chlorid.

6. The process which consists in adding to a solution containing ammonia and copper, cellulose, until no more is dissolved, then adding cuprous chlorid.

7. The process which consists in adding to a solution containing ammonia and copper, cellulose until no more is dissolved, then alternately adding small quantities of cuprous chlorid and cellulose.

In testimony whereof I hereunto affix my signature in the presence of two witnesses.

FRIEDRICH LEHNER.

Witnesses:
 CARL CUBLER,
 ARTHUR J. BUNDY.